United States Patent [19]

Walker

[11] 4,185,083

[45] Jan. 22, 1980

[54] MANUFACTURE OF FINELY DIVIDED CARBON

[75] Inventor: David G. Walker, Baytown, Tex.

[73] Assignee: Tenneco Chemicals, Inc., Saddle Brook, N.J.

[21] Appl. No.: 898,624

[22] Filed: Apr. 21, 1978

[51] Int. Cl.$^2$ .................. C01B 31/02; C09C 1/48; C10J 3/00
[52] U.S. Cl. .................. 423/449; 423/445; 423/459; 423/461; 48/203
[58] Field of Search ............ 423/449, 445, 459, 461, 423/246, 453; 48/203, 210, 214 A; 23/259.5

[56] References Cited

U.S. PATENT DOCUMENTS

| | | | |
|---|---|---|---|
| 1,803,855 | 5/1931 | Kramer et al. ............ | 423/459 |
| 3,861,885 | 1/1975 | Schora .................... | 23/259.5 X |
| 3,884,649 | 5/1975 | Matthews ................. | 48/203 X |
| 3,923,958 | 12/1975 | Turnbo et al. ............ | 423/246 X |
| 3,927,176 | 12/1975 | Turnbo et al. ............ | 423/246 X |
| 4,049,570 | 9/1977 | Gerbhardt et al. ........ | 48/203 X |

*Primary Examiner*—O. R. Vertiz
*Assistant Examiner*—Gregory A. Heller
*Attorney, Agent, or Firm*—John Boustead; Thomas E. Spath

[57] ABSTRACT

Finely divided carbon is manufactured by a process including producing a gaseous stream containing carbon monoxide by reacting coal and air in a slagging ash gasifier, separating carbon monoxide from the gaseous mixture, and disproportionating the carbon monoxide to produce finely divided carbon and carbon dioxide, the latter of which is recycled to the gasifier.

9 Claims, 1 Drawing Figure

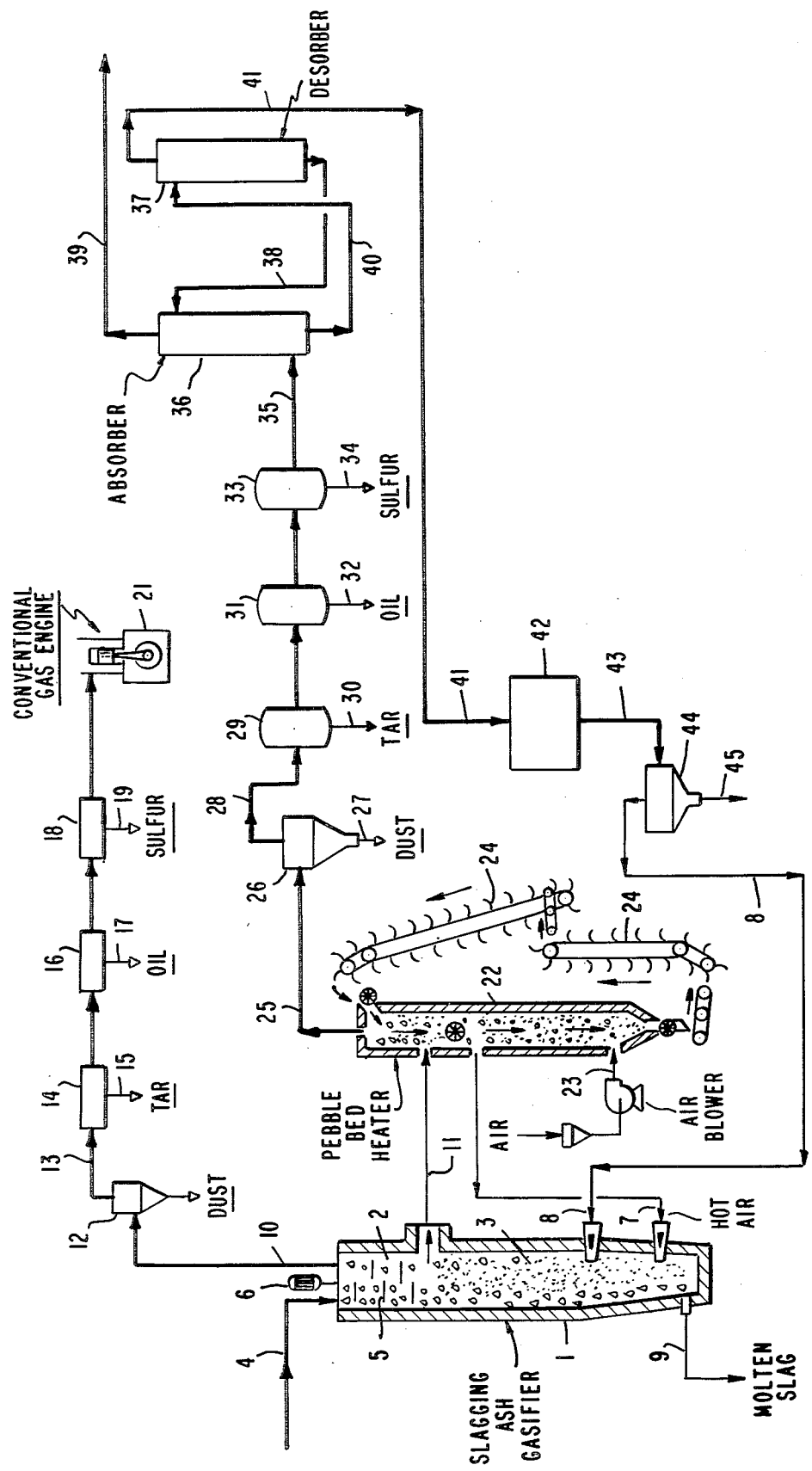

MANUFACTURE OF FINELY DIVIDED CARBON

BACKGROUND OF THE INVENTION

Brief Summary Of The Invention

Interest in the use of coal rather than oil is intense due to the size of the reserves of coal in comparison with the size of the reserves of oil and also the desire of countries with reserves of coal but small reserves of oil to lessen or even free themselves of dependence for energy upon countries which produce and export oil.

A market where coal presents no competition for oil is for mobile motor fuel. All the world's cars, trucks and trains run on gasoline or diesel fuel, with the very minor exception of a few electric vehicles confined to short runs around the most intensely urbanized areas. The dominance of oil in the mobile motor fuel market is due to the oil refinery. Without an oil refinery, the ash, sulfur and tar present in crude oil would preclude its use in internal combustion engines.

The natural fuel product from coal, free of ash, sulfur and tar, is carbon. Up to the making of the present invention, no sensible way existed to produce essentially pure carbon from coal. The coking of coal leaves all of the ash and a great deal of the sulfur in the coke, and therefore is not a way of producing essentially pure carbon from coal.

The present invention, on the other hand, provides a method for producing finely divided carbon from coal by reacting coal and air in a slagging ash gasifier to produce a gaseous mixture containing carbon monoxide, separating the carbon monoxide from the gaseous stream, and disproportionating the carbon mixture to produce finely divided carbon and carbon dioxide. At least a portion of the carbon dioxide produced by the disporportionation is returned to the gasifier.

The finely divided carbon is a suitable fuel for use in an internal combustion engine, for example, a diesel engine. When used as a fuel in an internal combustion engine, the exhaust from the engine contains essentially no pollutants, such as compounds containing carbon and hydrogen, compounds containing sulfur, or compounds containing lead. No catalytic converter, which increases considerably the cost of a vehicle powered by a fuel containing carbon and hydrogen, is needed.

The finely divided carbon, being essentially free from sulfur, can also be used advantageously as a fuel in the heating of buildings or for the generation of steam or electricity in centers of high density population.

Processes are known for the conversion of coal into liquid fuel suitable for use in an internal combustion engine, perhaps the most efficient of which is the Fischer-Tropsch process practiced in the South African Sasol Plant, mentioned on page 672 of Volume 5 of Kirk-Othmer, Encyclopedia of Chemical Technology (Second Edition, 1964).

When this invention is practiced, in a preferred embodiment, the product is carbon dust. The energy recovery from coal is much greater than is the case when liquid fuel is produced by the Fischer-Tropsch process. In addition, only one-fifth to one-tenth as much work [compressors, etc.] is needed to produce carbon as to produce liquid hydrocarbons from coal.

The Drawing

The accompanying drawing shows an arrangement of apparatus in which the method of this invention can be carried out. Further information concerning the drawing is set forth below.

DETAILED DESCRIPTION

In practicing the method of this invention, carbon monoxide is produced in slagging ash gasifier 1 by the reaction of coal, air and carbon dioxide. The coal introduced into the gasifier by means of inlet line 4 preferably has a size range from about one to eight centimeters and preferably has a moisture content not exceeding about 5 per cent by weight.

In the operation of the gasifier, a low-temperature distillation occurs in the upper portion of the gasifier, volatilizing tar, oil and sulfur out of the coal and producing a low-temperature coke. The tar, oil and sulfur volatilized in the upper potion of the gasifier are removed overhead and can be recovered by conventional means. The overhead temperature is preferably within the range from 100° C. to 300° C. in order (1) to make available as separate streams the hydrogen and methane gas and other hydrogen-rich condensable compounds which are made during the production of the low-temperature coke; (2) to maximize the latent energy in the main gas-stream (stream 11 of the drawing) in the form of carbon monoxide; and (3) to minimize the moisture content of the main gas-stream. It is important, in separating the carbon monoxide with a sorbent comprised of a bimetallic salt having the generic formula $CuAlX_4$ as hereinafter described, that the latent heat of the coal be converted mainly to carbon monoxide and that the production of carbon dioxide, water vapor, hydrogen and methane be minimized. The correct selection and operation of the gasifier is a major factor controlling the feed composition to an operation using the sorbent comprised of a bimetallic salt, and therefore determines greatly the overall results achievable. The heat required to volatilize the tar, oil and sulfur in the upper portion of the gasifier is provided by an upwardly-flowing slip stream of producer gas made as described in the next paragraph.

As the coal moves down the gasifier further, the low-temperature coke reacts with the air and carbon dioxide introduced into the gasifier to form producer gas which contains carbon monoxide as well as nitrogen introduced with the air. The producer gas is removed from the gasifier through line 11 for further processing.

For further information concerning the operation of slagging ash gasifiers, reference is made to Kirk-Othmer, Encyclopedia of Chemical Technology (Second Edition, Volume 10, (1966), pages 359 to 372, and the references cited on those pages).

The gas leaving gasifier 1 through line 11 is preferably passed into heat-exchange relationship with the air introduced into the gasifier through line 7. The heat-exchange relationship can be accomplished using a pebble bed heater 22, information concerning which is set forth on pages 9-58 through 9-60 of Chemical Engineers' Handbook (Perry, Fourth Edition—1963).

The gas exiting heater 22 through line 25 is then advisedly processed by conventional means to eliminate dust, tar, oil and sulfur before the gas is processed in such a manner as to increase its percentage of carbon monoxide. This can be done, for example, by absorbing the carbon monoxide using an ammoniacal copper carbonate, copper acetate, or copper formate solution in accordance with techniques which are shown in the art. Details relating to this kind of operation are set forth on pages 438 and 439 of Volume 4 of Kirk-Othmer, Encyclopedia of Chemical Technology, Second Edition (1964) and references cited on those pages. It is preferred, however, in practicing this invention, that the carbon monoxide be separated by contacting the gaseous stream containing carbon monoxide with a sorbent comprised of a bimetallic salt having the generic formula $CuAlX_4$, wherein X is chlorine or bromine. Information concerning this type of operation is given in U.S. Pat. No. 3,651,159 to R. B. Long et al., granted Mar. 21, 1972. If desired, the carbon monoxide can also be separated using an absorbent system consisting essentially of an inert diluent and a copper (I) salt of a sulfonic acid or of a dialkyl phosphate, as is described in U.S. Pat. No. 4,042,669 to Marvin M. Johnson et al., granted Aug. 16, 1977.

The carbon monoxide is then disporportionated to form carbon dioxide and finely divided carbon. This is a well-known reaction, and is commonly referred to as the Boudouard reaction. The reaction can be carried out using any of a wide variety of catalysts, such as palladium deposited on silica gel, reduced iron oxide, reduced nickel oxide, reduced cobalt oxide, and nickel tetracarbonyl. For further information concerning the disproportionation of carbon monoxide to carbon dioxide and carbon, reference is made to pages 219 and 221 of "Catalysts then and now" by Emmett, Sabatier and Reid; to page 431 of Volume 4 of Kirk-Othmer, Encyclopedia of Chemical Technology, (Second Edition, 1964); and to British Pat. Nos. 246,130 and 246,132 to J. G. Aarts.

The products of the disproportionation of the carbon monoxide are a gaseous phase which contains carbon dioxide and any carbon monoxide which passes unconverted through the dsporportionation, and a solid phase which is finely divided carbon. The solid phase is separated from the gaseous phase using conventional gas-solid separation equipment, such as a cyclone. Details concerning such equipment are given at pages 20, 62 to 96, of Perry's Chemical Engineers' Handbook, Fourth Edition (1963). Electrostatic precipitation (Cottrell)jand bag filtration can also be used to recover the finely divided carbon. The finely divided carbon recovered is a useful fuel.

Most of all of the gas separated is required to the gasifier, since this gas contains carbon dioxide which, by being returned to the process, can produce a further amount of finely divided carbon. While not widely practiced, the recycle of crbon dioxide to a gasifier serves the same purpose as the introduction of steam into a gas producer, in that the recycle of carbon dioxide converts sensible heat of the gasifier into latent heat in the form of carbon monoxide. The introduction of carbon dioxide into the gasifier is not the exact equivalent of the introduction of steam into the gasifier, however, since the introduction of carbon dioxide does not produce hydrogen, whereas the introduction of steam does. It is easy to separate carbon monoxide from hydrogen but the hydrogen emerges with nitrogen and the latent heat it contains is therefore essentially lost. Undecomposed steam, in contrast to unreacted carbon dioxide, carries a substantial amount of energy as latent heat of evaporation of water. This energy is lost and thus there is a lower useful energy yield in the gasification.

The following Example sets forth an embodiment of the invention and is not limitative thereof. The Example is to be considered in connection with the drawing which accompanies this specification.

The flows are stated at kilograms per hour, the pressures are stated at substantially atmospheric and the temperatures are stated at degrees Centigrade, unless otherwise stated.

EXAMPLE

Referring now to the drawing, the numeral 1 represents a refractory-lined slagging ash gasifier which is operated at a pressure of about 1.8 atmospheres absolute and which has a height of about 9 meters and an internal diameter of about 10 meters. The gasifier has an upper portion 2 having a height of about 4 meters and a lower portion 3 having a height of about 5 meters.

By means of line 4, nonagglomerating bituminous coal having a size within the range from two to five centimeters is introduced into the gasifier at a flow of 86,630. The coal has the following proximate analysis in per cent by weight: fixed carbon, 53.6; volatile matter, 32.0; water, 1.0; ash, 10.6; and sulfur, 2.8. Thus, the flows for fixed carbon; volatile matter; water; ash and sulfur present in the coal feed are 46,500; 27,700; 910; 9,120 and 2,400, respectively. The gasifier is provided with revolving arms 5 driven by motor 6 for working the coal down the gasifier.

Also, into gasifier 1 by means of line 7 at a point about one meter from the bottom of the gasifier there is introduced air at a temperature of about 450°–650° C., at an absolute pressure of 1.9 atmospheres and at a flow of 2,400,000 kilogram mols per hour. In addition, into gasifier 1 by means of line 8 at a point about 2 meters from the bottom of the gasifier there is introduced a mixture of carbon dioxide and carbon monoxide at a temperature of about 400°–600° C. and at an absolute pressure of 2.0 atmospheres. The flows of carbon monoxide and carbon dioxide in this mixture are 360 and 3585 kg. mols/hour, respectively. Molten slag at a flow of 8,620 and at a temperature exceeding 1400° C. is removed through line 9.

The gasifier 1 is operated in such manner that in the upper zone 2 at a low temperature distillation occurs. Oil and tar are volatilized from the coal and are removed through line 10. Producer gas is formed in the lower zone 3. A portion of the producer gas is removed through line 11, and the remainder passes upwardly through zone 2.

The stream exiting gasifier 1 through line 10 is at 125° C. and is subjected to conventional processing steps in order to remove dust, tar, oil and sulfur, leaving a stream of clean gas which is suitable for use in an internal combustion engine to produce mechanical energy. Thus, stream 10 is introduced into cyclone 12, from the bottom of which dust is withdrawn at a flow of 300. The gaseous stream exiting cyclone 12 through line 13 is introduced into cooler 14, from which tar is withdrawn through line 15 at a flow of 9000. The numeral 16 represents a condenser, from which oil is withdrawn through line 17 at a flow of 12,000. The stream of gas is then further cooled in cooler 18, from which molten sulfur is withdrawn through line 19 at a flow of 1,200. The desulfurized gas passes through line 20 at a flow of 1500 kg. mols/hour and contains approximately 8 per cent carbon dioxide, 23 percent carbon monoxide, 18 per cent hydrogen, 2 per cent methane and 49 per cent nitrogen, all by volume. The desulfurized gas is used as fuel in gas engine 21.

Continuing with the operation of gasifier 1, through line 11, located at a point about 5–6 meters from the bottom of the gasifier, at a temperature of about 500°-700° C. and at an absolute pressure of about 1.7 atmospheres absolute there is removed a gas stream at a flow of 17,000 kg. mols/hour. This stream is introduced into pebble bed heater 22 into which air is introduced at a flow of 8,200 kg. mols/hour through line 23 and removed through line 7. Pebble bed heater 22 is provided with bucket elevator 24.

Overhead from pebble bed heater 22 there is removed through line 25 a stream of cooled producer gas at a temperature of about 100° C. This gas is processed similarly to that flowing through line 10. Thus, the stream flowing through line 25 is introduced into cyclone 26, from the bottom of which dust is withdrawn through line 27. The stream exiting cyclone 26 through line 28 is introduced into cooler 29, from which tar is withdrawn through line 30. The numeral 31 represents a condenser from which oil is withdrawn through line 32. The stream of gas is further cooled in cooler 33, from which sulfur is withdrawn through line 34 at a flow of 600. The desulfurized gas passes through line 35 at a flow of 17,400 kg. mols/hour and contains approximately 8 per cent carbon dioxide, 45 per cent carbon monoxide and 46 per cent nitrogen, all by volume. The desulfurized gas is then subjected to a procedure in which carbon monoxide is recovered from the gas in absorption tower 36 and desorption tower 37 provided with conventional liquid-vapor contact means.

Thus, near the top of tower 36 there is introduced through line 38 a liquid absorbent which is $Cu(AlCl_4)$ in an aromatic solvent. The carbon monoxide introduced into tower 36 is absorbed, while the carbon dioxide and nitrogen are rejected from the system by means of line 39. The absorbent, enriched with carbon monoxide, is removed from tower 36 by means of line 40, and is introduced into tower 37, from the top of which gaseous carbon monoxide at a temperature of 40°-100° C. flows at a rate of 7800 kg. mols/hour through line 41. Solvent is removed from tower 37, is cooled by means not shown, and is then introduced into tower 36 by means of line 38.

The gas flowing through line 41 is then introduced into Boudouard shift reactor 42 wherein the reaction $2 CO = C + CO_2$ is carried out. Shift reactor 42 contains reduced nickel oxide as a catalyst in the form of pellets.

From shift reactor 42 through line 43 there is withdrawn a stream the gaseous portion of which is composed of 90% carbon dioxide and 10% carbon monoxide, the percentages being by volume. This stream is introduced into centrifugal separator 44 from the bottom of which by means of line 45 finely divided carbon powder is removed at a flow rate of 3,580 kg. mols/hour. The gases entering separator 44 are removed by means of line 8 and are introduced into gasifier 1.

What is claimed is:

1. A method for the production of carbon in finely divided form which comprises
    a. introducing coa, air and a mixture containing carbon dioxide and carbon monoxide into a slagging ash gasifier in the upper portion of which tar, oil and sulfur are volatilized from the coal and a low temperature coke is produced, and in the lower portion of which carbon monoxide and molten slag are produced,
    b. removing volatilized tar, oil and sulfur from the top of the gasifier,
    c. removing molten slag from the bottom of the gasifier,
    d. removing a gaseous stream comprising principally carbon monoxide and nitrogen from an intermediate point of the gasifier,
    e. separating a stream consisting essentially of carbon monoxide from said gaseous stream,
    f. disproportionating said stream of carbon monoxide whereby a mixture of carbon in finely divided form and a gaseous mixture containing carbon dioxide and carbon monoxide are produced,
    g. separating the carbon from the gaseous mixture containing carbon dioxide and carbon monoxide and
    h. introducing the mixture containing carbon dioxide and carbon monoxide into said slagging ash gasifier.

2. A method according to claim 1 wherein the coal introduced into the gasifier has a size within the range from one to eight centimeters.

3. A method according to claim 1 wherein the volatilized tar, oil and sulfur removed from the top of the gasifier is at a temperature within the range from 100° C. to 300° C.

4. A method according to claim 1 wherein said stream consisting essentially of carbon monoxide is separated using a sorbent comprised of a bimetallic salt having the generic formula $CuAlX_4$, wherein X is chlorine or bromine.

5. A method according to claim 4 wherein said sorbent is $CuAlCl_4$ in toluene.

6. A method according to claim 1 wherein said strea consisting essentially of carbon monoxide is disproportionated using an iron carbonyl or nickel tetracarbonyl catalyst.

7. A method according to claim 1 wherein the air introduced into the slagging ash gasifier is preheated by heat-exchange with the gaseous stream comprising principally carbon monoxide and nitrogen removed from an intermediate point of the gasifier.

8. A method according to claim 1 wherein the volatilized tar, oil and sulfur removed from the top of the gasifier is at a temperature within the range from 100° C. to 300+ C. and wherein said stream consisting essentially of carbon monoxide is separated using a sorbent comprised of a bimetallic salt having the generic formula $CuAlX_4$, wherein X is chlorine or bromine.

9. A method according to claim 8 wherein said sorbent is $CuAlCl_4$ in toluene.

* * * * *

UNITED STATES PATENT AND TRADEMARK OFFICE
CERTIFICATE OF CORRECTION

PATENT NO. : 4,185,083
DATED : January 22, 1980
INVENTOR(S) : Walker

It is certified that error appears in the above-identified patent and that said Letters Patent are hereby corrected as shown below:

Column 2, line 16, change "potion" to --portion--

Column 2, line 66, change "shown" to --known--

Column 3, line 45, after "Most" change "of" to --or--; change "required" to --returned--

Column 3, line 42, change "jand" to --and--

Column 3, line 49, change "crbon" to --carbon--

Column 5, line 57, change "coa" to --coal--

Column 6, line 40, change "strea" to --stream--

Column 6, line 52, change "300+" to --300°--

Signed and Sealed this

Fifteenth Day of April 1980

[SEAL]

Attest:

SIDNEY A. DIAMOND

Attesting Officer

Commissioner of Patents and Trademarks